US007474762B2

(12) United States Patent
Dimeski

(10) Patent No.: US 7,474,762 B2
(45) Date of Patent: Jan. 6, 2009

(54) FRANKING MACHINE PROVIDED WITH A DEVICE FOR MONITORING CONFORMITY OF THE POSTAL INDICIA

(75) Inventor: Joska Dimeski, Paris (FR)

(73) Assignee: Neopost Industrie, Bagneux (FR)

( * ) Notice: Subject to any disclaimer, the term of this patent is extended or adjusted under 35 U.S.C. 154(b) by 729 days.

(21) Appl. No.: 10/265,141

(22) Filed: Oct. 7, 2002

(65) Prior Publication Data

US 2003/0068070 A1 Apr. 10, 2003

(30) Foreign Application Priority Data

Oct. 5, 2001 (FR) .................................. 01 12818

(51) Int. Cl.

*G06K 9/00* (2006.01)
*B07C 5/00* (2006.01)
*G06F 17/00* (2006.01)
*B41J 29/393* (2006.01)

(52) U.S. Cl. ....................... 382/101; 209/584; 705/401; 347/19

(58) Field of Classification Search ....................... None
See application file for complete search history.

(56) References Cited

U.S. PATENT DOCUMENTS 5,297,017 A * 3/1994 Haselby et al. ............... 347/19
6,106,095 A 8/2000 Jackson et al.
6,234,693 B1 5/2001 Gregoire et al.
6,427,021 B1 * 7/2002 Fischer et al. ............... 382/101
6,435,642 B1 * 8/2002 Jackson et al. ................ 347/19
6,439,684 B1 * 8/2002 Yoshimura et al. ............ 347/19
7,138,596 B2 * 11/2006 Pippin et al. ................ 209/584
2001/0056408 A1 * 12/2001 Herbert ....................... 705/60
2002/0176111 A1 * 11/2002 Shaw et al. ................ 358/1.18

FOREIGN PATENT DOCUMENTS

EP 0 714 777 6/1996
FR 2 759 186 8/1998

* cited by examiner

*Primary Examiner*—Charles Kim
(74) *Attorney, Agent, or Firm*—Sughrue Mion, PLLC

(57) ABSTRACT

This invention relates to a machine for franking mail items, comprising means for printing postal indicia on a mail item, means for detecting the position of this mail item along a path of travel of this item and control means linked to said detection means and to said printing means for proceeding with printing postal indicia on said mail item at a predetermined place, and means for acquisition and processing of an image of such printed postal indicia so as to determine the conformity thereof with respect to at least one predetermined reference image. These image acquisition and processing means comprise in particular means for determining a lack of registration of said printed postal indicia.

18 Claims, 3 Drawing Sheets

FRANKING MACHINE PROVIDED WITH A DEVICE FOR MONITORING CONFORMITY OF THE POSTAL INDICIA

FIELD OF THE INVENTION

The present invention relates to the domain of mail handling and more particularly to a device for monitoring the conformity of postal indicia printed by a franking machine to the standards defined by the Postal Service.

BACKGROUND OF THE INVENTION

Conventionally, postal indicia being a monetary value, the quality of their printing on mail items is primordial in order to avoid any fraud or any financial loss for the user in the event of rejection of the franking by the Postal Service.

However, at the present time, there is no systematic monitoring of the quality of print, it being generally checked by the user only after a first rejection by the Postal Service. On the contrary, in certain mailing firms where the franking rates are very high and the rejections likely to cause a considerable financial prejudice, a manual sample check is made by regularly examining franked mail items at the exit of the franking machine.

It is an object of the present invention to overcome the drawbacks resulting from the absence of monitoring or from a simple sample check by hand of the quality of print of postal indicia, by proposing a franking machine allowing an automatic and systematic check of the quality of print of all postal indicia printed. Another purpose of the invention is to allow, at the same time, a control of possible service markings which may be printed on the mail items. Yet another purpose of the invention is to propose a franking device which is simple to use and whose general architecture is not affected to a perceptible degree.

SUMMARY OF THE INVENTION

These objects are attained by a machine for franking mail items, comprising means for printing postal indicia on a mail item, means for detecting the position of this mail item along a path of travel of this item and control means linked to said detection means and to said printing means for proceeding with printing postal indicia on said mail item at a predetermined place, characterized in that it further comprises means for acquisition and processing of an image of such printed postal indicia so as to determine the conformity thereof with respect to at least one predetermined reference image.

With the present invention, it is thus possible to monitor in real time the quality of print of the postal indicia, directly during the franking process and without disturbing said process.

Such monitoring may be extended to the image of a service marking printed on the mail item jointly with the postal indicia.

The predetermined reference image is preferably formed by at least a part of the invariable graphic elements of said postal indicia such as the surrounds or official legend of the stamp or of the date stamp.

According to an advantageous form of embodiment, these image acquisition and processing means comprise an image acquisition module (advantageously a matrix of photoconductive devices of CCD type) in order to obtain a digital image of the postal imprint printed, an image processing module linked to said acquisition module and to said control and monitoring means in order to process the image thus acquired, and a memory module linked to the processing module in order to memorize said predetermined reference images.

The memory module may be integrated in the image processing module which may itself be integrated in the control means.

The image processing module comprises means for comparing at least a part of said image of the printed postal indicia with a corresponding part of said predetermined reference image and means for determining a defect in registration of said printed postal indicia.

The franking machine according to the invention preferably further comprises either alerting means inviting the user to stop the functioning of the machine when said comparison means indicate a non-conformity of the print, or means for automatically stopping this functioning.

In a particular form of embodiment, the means for detecting the position of said mail item comprise means for detecting a leading edge of said mail item.

BRIEF DESCRIPTION OF THE DRAWINGS

The invention will be more readily understood on reading the following description given by way of non-limiting example, with reference to the accompanying drawings, in which.

DESCRIPTION OF PREFERRED EMBODIMENT

Figure 1:
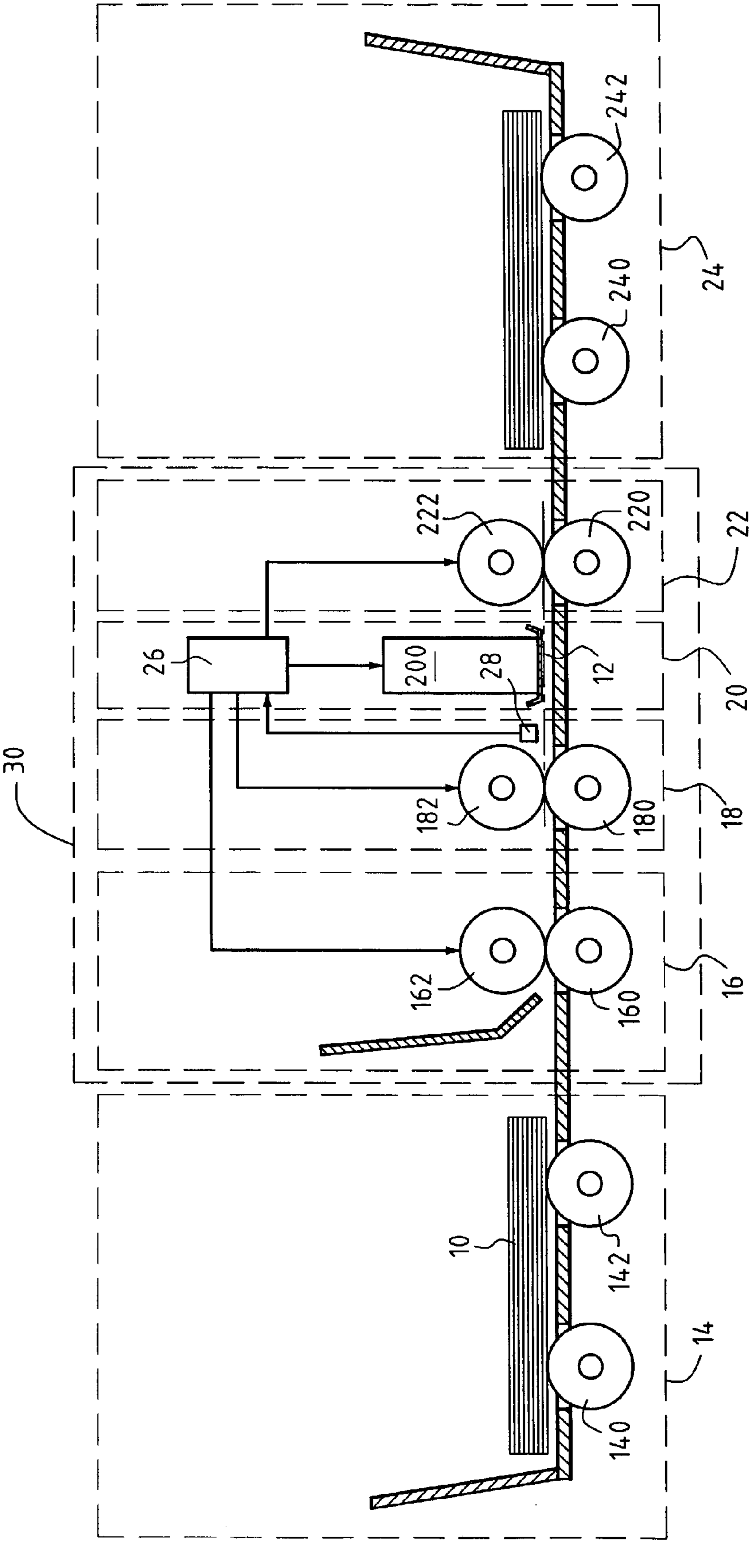
FIG. 1 is a schematic view in longitudinal section of a conventional mail handling machine.

Referring now to the drawings, FIG. 1 schematically shows the different components of a conventional mail handling machine. Such a machine conventionally comprises, in the direction of advance of the mail items 10 and along a path of travel 12 of these items: means 14 for feeding mail items intended to receive a stack of mail items of variable dimensional characteristics, and in particular of different thicknesses, and which comprise first motorized drive rollers 140, 142; selection means 16 for individually selecting each mail item from the stack and which comprise selection rollers and backing rollers 160, 162; upstream conveying means 18 for conveying each selected item and comprising upstream conveying rollers and backing rollers 180, 182; franking means 20 for proceeding with printing postal indicia on each previously selected mail item and advantageously comprising an ink jet print module 200; downstream conveying means 22 for conveying each franked item and which comprise downstream conveying rollers and backing rollers 220; 222; and means 24 for storing the mail items intended to receive all the franked items and which comprise second motorized drive rollers 240, 242.

Of course, this mail handling machine further comprises, on the one hand, control and monitoring means 26 (more particularly with memory and microprocessor) for managing printing and conveying of the mail items through the machine along the path of travel 12, and, on the other hand, means 28 for detecting the position of these mail items (advantageously of the leading edge of the mail item) linked to said control and monitoring means and from which the printing of the postal indicia is synchronized (as a function of a predefined standard offset defining a predetermined place for the print).

In general, the selection means 16, the conveying means 18, 22 and the franking means 20 are grouped together in a single structure, called a franking machine, fed with mail items by the independent feed means 12, called feeder. Mail item is understood to mean both an envelope (of any format) and a label intended thereafter to be stuck on a thick envelope or a packet.

According to the invention, the franking machine further comprises integrated image acquisition and processing means 30 for monitoring in situ, during the franking process, on each franked mail item, the quality of print of the postal indicia. Such monitoring is effected by determining the conformity of an image of this printed indicia to a predetermined reference image.

Figure 2:
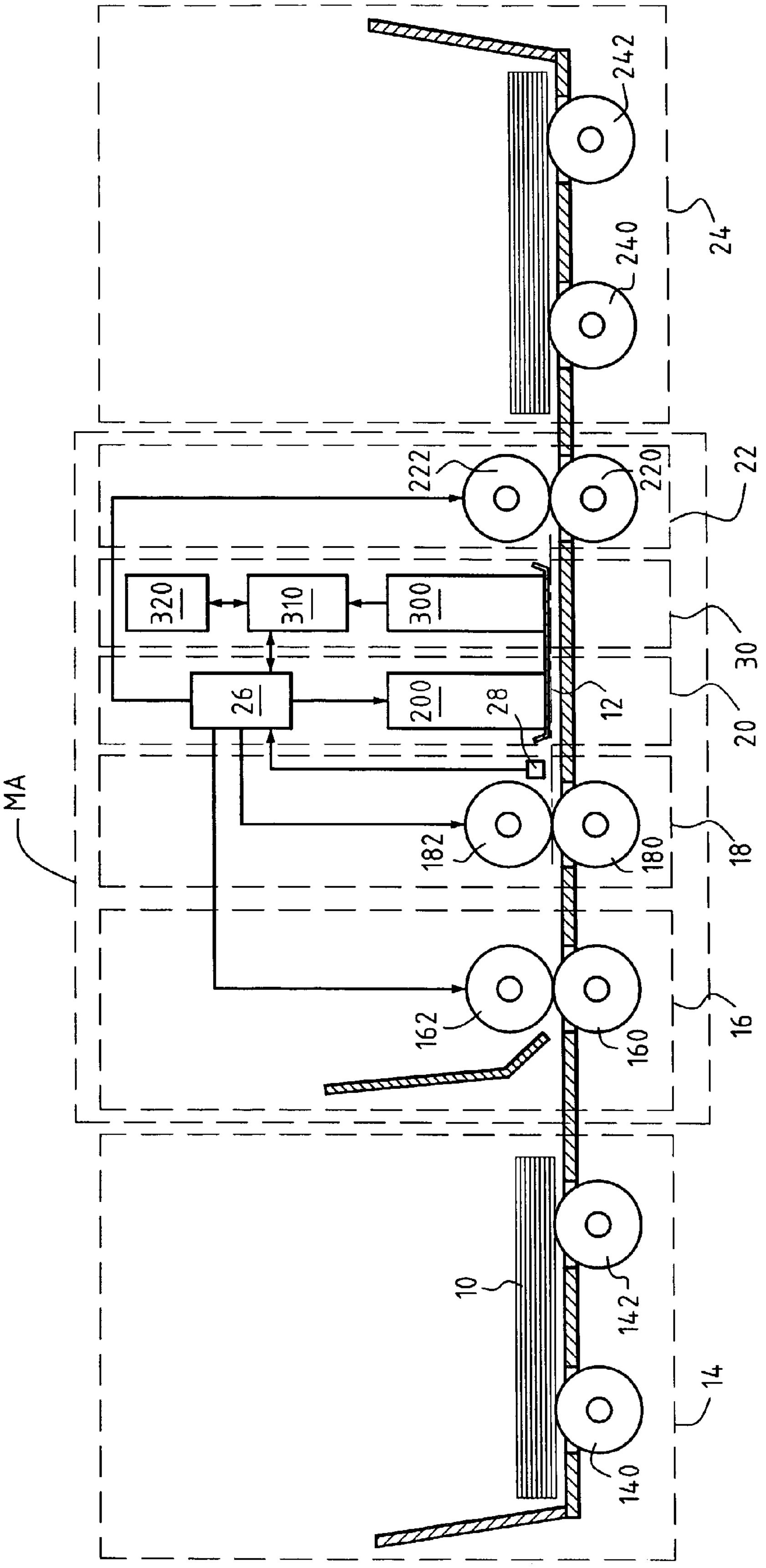
FIG. 2 is a schematic view in longitudinal section of a mail handling machine according to the invention.

According to FIG. 2, these means 30 comprise a digital image acquisition module 300 preferably disposed as near as possible to the printing module 200, above the path of travel of the mail items, and an image processing module 310 linked, on the one hand, to this acquisition module and, on the other hand, to the control and monitoring means 26 of the machine. A memory module 320 previously loaded with the reference images from which the processing module will verify the conformity of the printed postal indicia, is also linked to the processing module (in a variant, it may be integrated in this module). It will be noted that the processing of the image (including the memorization of the reference images) being essentially software-related, it may be shifted to the level of the general control and monitoring means 26 with memory and microprocessor of the franking machine, the means 30 in that case being reduced to one single module 300 performing the function of image acquisition.

The module 300 which allows acquisition of a digital image is conventionally formed by a matrix of photoconductive elements of the CCD (Charged Coupled Device) image pickup type of sufficient format for the acquisition of all or preferably of a part of the invariable graphic elements of the postal indicia (surround, official legend). For example, the inventors were able to test that an acquisition format of 764× 564pixels allows in practice the acquisition of these graphic elements for postal indicia equally well in the French, British, German or American format. The image data acquisition is synchronized from the detection of a position of the mail item obtained by the detector 28 and to which is applied a retard (advantageously software-related) corresponding to the time that this mail item takes to move between this detector and the image sensor (the speed of advance of the items is constant and known from means 26). The detected position of the mail item is preferably that corresponding to the leading edge of this item.

In order to avoid the use of this retard, it is, of course, also possible to employ an additional specific sensor (not shown) disposed directly at the level of the image sensor, at the exit of the printing module 200, and giving a start mark for the acquisition of the image.

The module 310 which allows automatic processing of the image acquired by the acquisition module, comprises conventional means for filtering this image in order in particular to overcome the different granulosities of the mail items or the difference in luminosity resulting from the quality of the ink used for example, and comparison means for seeking on the acquired image zones of particular interest which will be compared with target zones previously extracted from characteristic reference images of typical postal indicia and memorized in the memory module 320 during a prior setting phase (calibration of the acquisition).

Figure 3:
FIG. 3 shows a typical specimen of postal indicia.

FIG. 3 shows a postal indicia specimen of a Postal Service as memorized in the module 320. In order to facilitate the step of comparison, this specimen comprises only the graphic elements of the indicia which are invariable with the franking.The amount of franking in the stamp or the date of franking in the date stamp are therefore not shown. It will be noted that it is also possible to memorize only the target zones of this indicia appearing at determined places of the indicia and not the whole of the indicia.

Figure 4A:
FIGS. 4A and 4B illustrate examples of zones of specific interest called characteristic targets of the typical postal indicia of FIG. 3.
Figure 4B:

FIGS. 4A and 4B illustrate two examples of zones of particular interest (target zones) retained to make a check on the quality of print of the postal indicia. In effect, it is not necessary to make such a check on the whole of the postal indicia and, in order to minimize the processing time, it is preferable to limit it to one or more determined particular zones of this imprint, intended to constitute predetermined reference images from which different comparisons may then be made. Of course, these zones will be a function of the type of print and of the model (French, British, etc.) of postal indicia analyzed.

In the case of an ink jet print, these zones of interest will preferably be chosen at the level of the central part of the surround forming the stamp of the postal indicia. In effect, in present franking machines of the inkjet jet type, the printing module always comprises two arrays of ejection nozzles which join substantially at the level of this central part. It is therefore at that particular place, where it is easier to determine the quality of the print and in particular to detect possible imprecisions in the assembly of these two arrays of nozzles, that it is therefore preferable to monitor conformity.

Figure 5:
FIG. 5 shows an embodiment of postal indicia after a real franking.

FIG. 5 shows an example of print of postal indicia on an inkjet franking machine. The slight offset, which appears all along this imprint at the level of its longitudinal axis, which precisely corresponds to the join of the two arrays of ejection nozzles of the printing module of this machine, will be observed.

Figure 6:
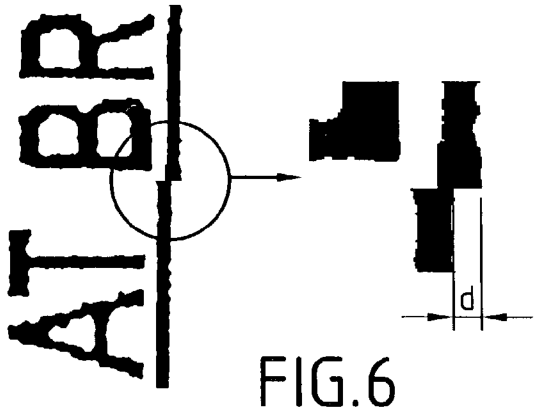
FIG. 6 shows the image of a real zone of interest obtained from the postal indicia of FIG. 5.

FIG. 6 illustrates the zone retained for comparison with the target zone of the imprint module (cf. FIG. 4A) and the part of image extracted from this zone from which will be determined two vertical reference lines separated by an offset d. Measurement of this offset (by a simple software-related counting of the pixels separating them) will make it possible precisely to evaluate the poor registration of the two arrays of nozzles and automatically to inform the user, for example by a sound or visual alerting message on the user interface of the franking machine, if such offset exceeds a predetermined range of values (in practice an offset included between −1.5 mm and +1.5 mm is not rejected by the Postal Service). The user may then stop functioning of the franking machine and proceed with an adjustment of the nozzles in order to render the print congruous. It should be noted that such a stop may, of course, be made automatically under the control of the means 26 informed by the acquisition module 300 of such non-conformity of the print (due to the excessive lack of registration).

With the invention, the random detection of a deficient quality of print of postal indicia thus makes it possible to limit the risks of rejection of mail items by the Postal Service. The determination of thresholds of tolerance defining the conformity of a parameter of quality to the Postal Service requirements makes it possible to avoid printing indicia likely to be rejected.

It will be noted that advantage may be taken of the presence of the image acquisition means 300 of the invention, also to monitor possible service markings printed on the mail item, particularly in line with the postal indicia, and therefore likely to pass under these acquisition means during ejection of the mail item. When the service marking is a bar code, decoding means must, of course, be provided at the level of the processing module 310 linked to these image acquisition means, in that case forming a bar code reader. The decoded information is then transmitted to the control means 26 to ensure exploitation thereof, for example when the franking machine is a communicating machine linked to a server of the distributor of this machine, for statistical or other purposes.

What is claimed is:

1. Machine for franking mail items, comprising means for printing postal indicia on each of a plurality of mail items that pass along a path of travel, means for detecting the position of each of the mail items along the path of travel, control means linked to said detection means and to said printing means for printing the postal indicia on each of the plurality of mail items at a predetermined place on the mail items, and means for acquisition and processing of images of the postal indicia printed on each of the plurality of mail items so as to determine the conformity thereof with respect to at least one predetermined reference image, wherein said means for acquisition and processing determines the conformity of the postal indicia printed on each of the plurality of mail items by measuring an offset between two portions of each of the acquired images and determining whether the offset is between −x and x, where x is determined in conformity with postal service requirements.

2. The franking machine of claim 1, wherein said image acquisition and processing means comprise an image acquisition module for obtaining a digital image of the printed postal indicia, an image processing module linked to said acquisition module and to said control and monitoring means for processing the acquired image, and a memory module linked to the processing module to memorize said at least one predetermined reference image.

3. The franking machine of claim 2, wherein said memory module is integrated in said image processing module.

4. The franking machine of claim 2, wherein said image processing module is integrated in the control means.

5. The franking machine of claim 2, wherein said image acquisition module comprises a matrix of photoconductive elements of CCD type.

6. The franking machine of claim 2, wherein said image processing module comprises means for comparing at least a part of each of said images of the printed postal indicia with a corresponding part of said predetermined reference image.

7. The franking machine of claim 6, wherein said predetermined reference image is formed by at least a part of the invariable graphic elements of said postal indicia.

8. The franking machine of claim 7, wherein the invariable graphic elements of said postal indicia comprise the surrounds or the official legend of the stamp or of the date stamp.

9. The franking machine of claim 6, wherein it further comprises alerting means inviting a user to stop the functioning of the machine when said comparison means indicate a non-conformity of the print.

10. The franking machine of claim 9, wherein it further comprises means for automatically controlling the stop of functioning of the machine when said comparison means indicate a non-conformity of the print.

11. The franking machine of claim 2, wherein said image processing module comprises means for determining a lack of registration of said printed postal indicia.

12. The franking machine of claim 1, wherein said means for detecting the position of said mail item comprise means for detecting a leading edge of this mail item.

13. The franking machine of claim 1, wherein said acquisition and processing means further ensure acquisition and processing of an image of a service marking printed on the mail item jointly with the postal indicia.

14. The franking machine of claim 1, wherein the two portions of the acquired image are joined at a position corresponding to a position where two arrays of ejection nozzles, of the means for printing postal indicia on a mail item, are joined.

15. A method for franking mail items using a franking machine, comprising printing postal indicia on each of a plurality of mail items that pass along a path of travel at a predetermined place on the mail items, detecting the position of each of the mail items along the path of travel, and acquiring and processing images of the postal indicia printed on each of the plurality of mail items so as to determine the conformity thereof with respect to at least one predetermined reference image by measuring an offset between two portions of each of the acquired images and determining whether the offset is between −x and x, where x is determining in conformity with the postal service requirements.

16. The method for franking mail items of claim 15, wherein the acquiring and processing images comprises obtaining a digital image of the printed postal indicia, processing the acquired image, and memorizing said at least one predetermined reference image.

17. The method for franking mail items of claim 15, further comprising alerting a user to stop the franking machine when a non-conformity is indicated.

18. The method for franking mail items of claim 15, further comprising automatically controlling a stop of functioning of the franking machine when a non-conformity is indicated.

* * * * *